(12) United States Patent
Ross et al.

(10) Patent No.: US 8,107,333 B2
(45) Date of Patent: Jan. 31, 2012

(54) CODING FOR OPTICAL STORAGE SYSTEMS WITH MULTIPLE READER HEADS AND MULTIPLE OPTICAL DISKS

(75) Inventors: John Anderson Fergus Ross, Niskayuna, NY (US); John Erik Hershey, Ballston Lake, NY (US); Xiaolei Shi, Niskayuna, NY (US); Xuefeng Wang, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/769,394

(22) Filed: Apr. 28, 2010

(65) Prior Publication Data
US 2011/0267933 A1    Nov. 3, 2011

(51) Int. Cl.
*G11B 15/02*    (2006.01)
(52) U.S. Cl. ................. 369/47.24; 369/124.08
(58) Field of Classification Search .......... None
See application file for complete search history.

(56) References Cited

U.S. PATENT DOCUMENTS

2005/0185542 A1*  8/2005  Iwase ............... 369/47.19
2005/0237872 A1* 10/2005  Nguyen et al. ..... 369/44.14

* cited by examiner

*Primary Examiner* — Paul Huber
(74) *Attorney, Agent, or Firm* — Fletcher Yoder

(57) ABSTRACT

Provided are methods and systems of encoding and decoding techniques in an optical storage system having a multi-head detector. In one embodiment, source data may be encoded using error correction coding (e.g., turbo coding) techniques, and the encoded data may be interleaved and distributed to more than one detector head of the multi-head detector. Data recorded in an optical disc may be retrieved by the multi-head detector, and a read data from more than one detector head may be concurrently decoded to retrieve estimates of the original information in the source data. Further, more than one encoder/decoder may be used, and each encoder/decoder may encode or decode data from multiple data heads. Some embodiments also include replicating multiple discs.

23 Claims, 9 Drawing Sheets

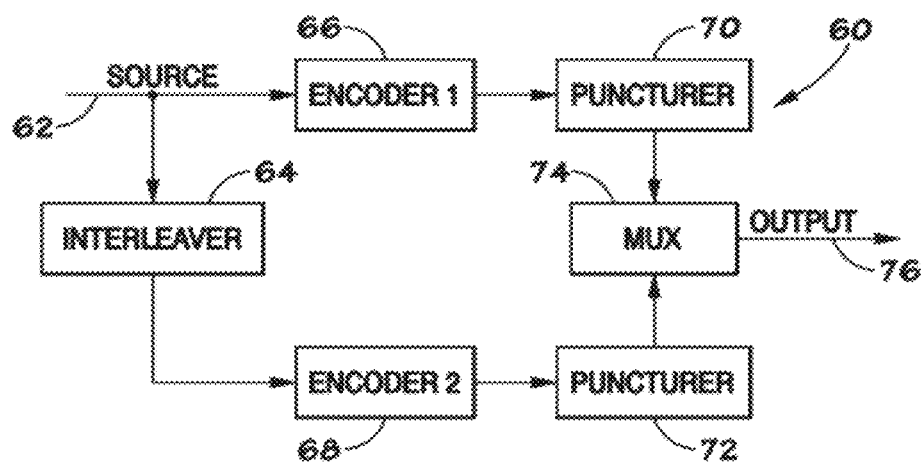
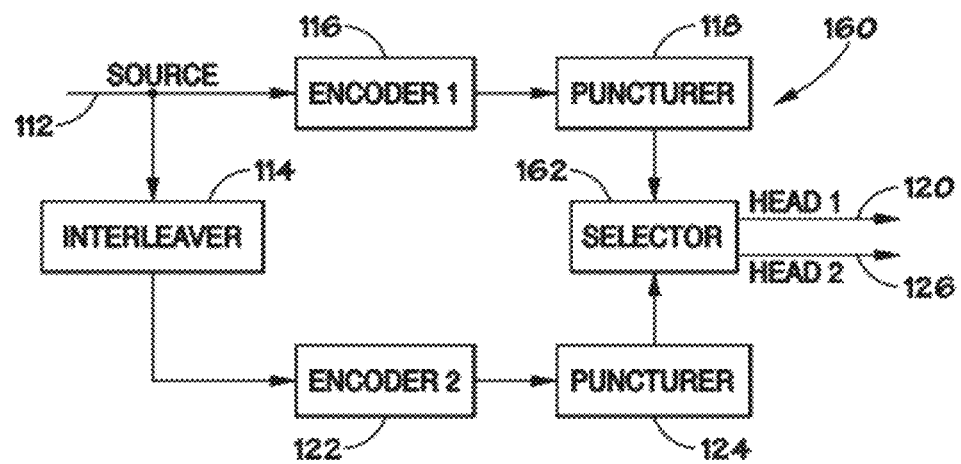

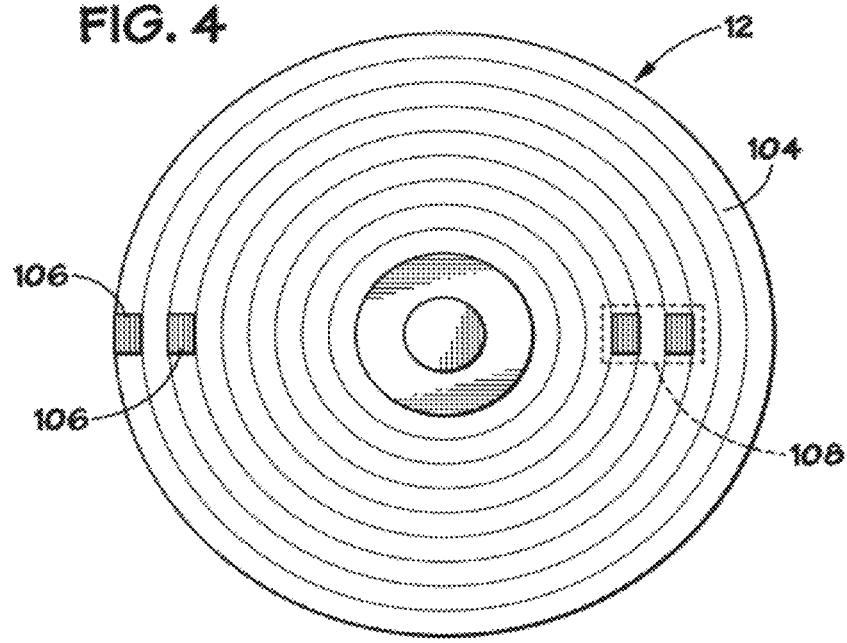
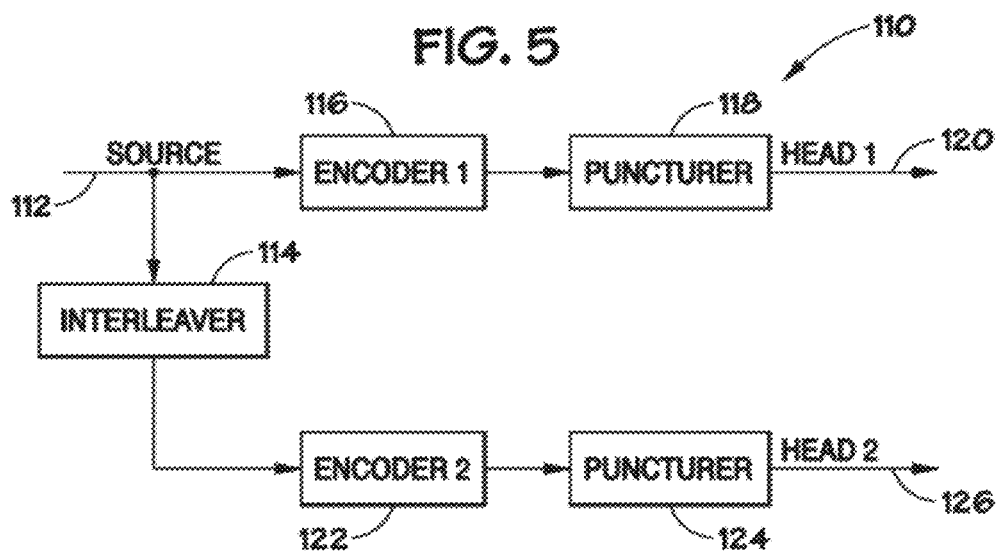

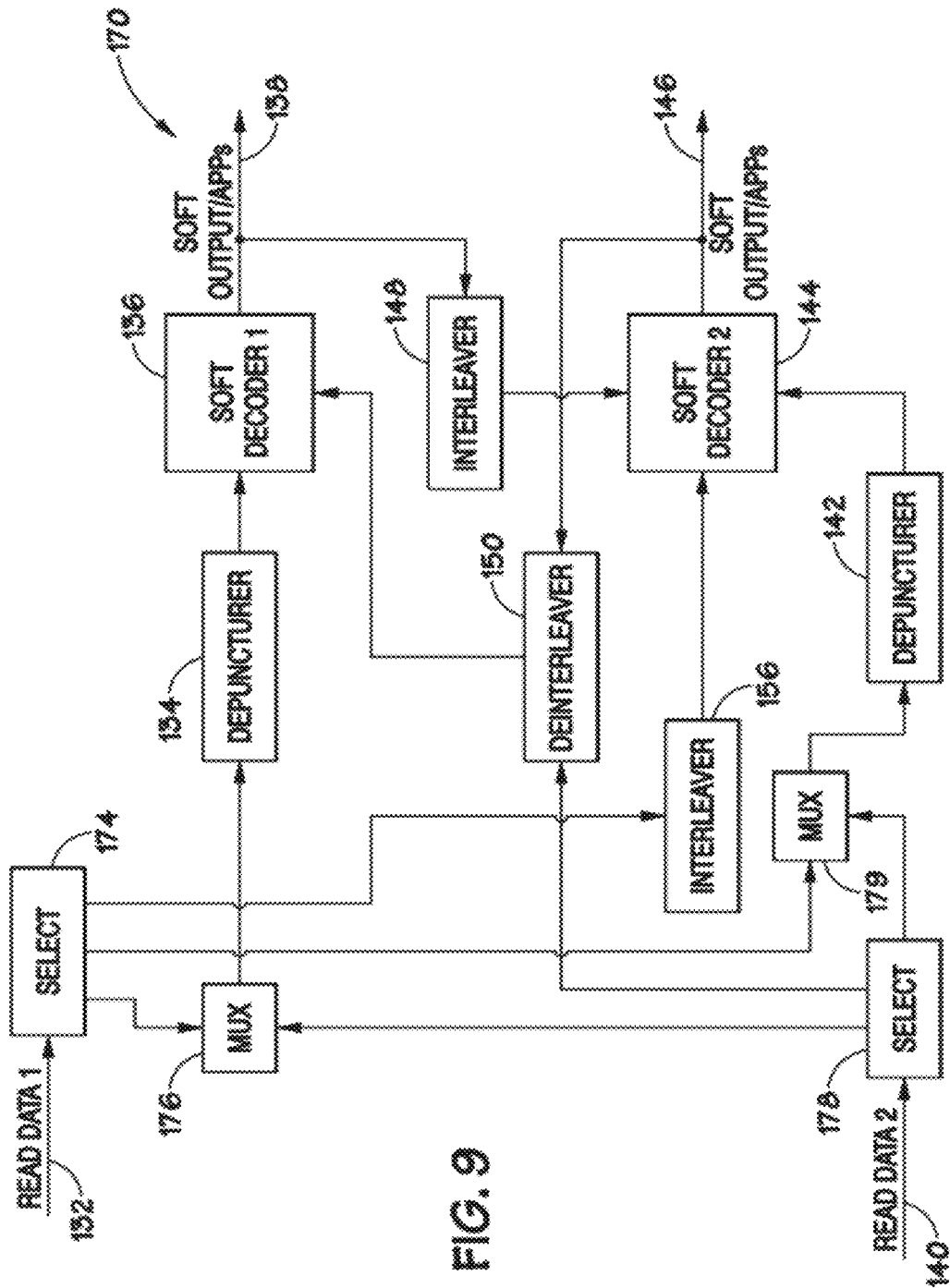

CODING FOR OPTICAL STORAGE SYSTEMS WITH MULTIPLE READER HEADS AND MULTIPLE OPTICAL DISKS

BACKGROUND

The subject matter disclosed herein relates to optical storage, and more particularly, to techniques for coding data in optical storage systems.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 min. of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet higher demands, such as the demand for higher resolution video formats. For example, high-capacity recording formats, such as the Blu-ray Disc™ format, is capable of holding about 25 GB in a single-layer disc, or 50 GB in a dual-layer disk. As computing technologies continue to develop, storage media with even higher capacities may be desired. For example, holographic storage systems and micro-holographic storage systems are examples of other developing storage technology that may achieve future capacity requirements in the storage industry.

Along with increases in data capacity, high data rates are also desired. For example, the video bit rate for a standard DVD format may be about 9.8 Mbps, and the video bit rate for a standard Blu-ray Disc™ format may be about 40.0 Mbps. Further data rate increases may also be expected as higher capacity storage systems (e.g., holographic or micro-holographic storage systems) are developed.

Data rates may be at least partially limited by the speed at which data may be recorded and retrieved. For example, in optical storage systems, data may be encoded and recorded to an optical disc by a read or write head (e.g., detector head). The recorded data may be read by the detector and decoded to retrieve the original information. Thus, methods for increasing the rate and accuracy at which data may be recorded and/or retrieved may obtain desirably higher data rates.

BRIEF DESCRIPTION

One embodiment includes an optical reader system. The optical reader system includes multiple heads, including a first head and a second head. The first head is configured to record data in a first data track of an optical medium of the optical reader system and the second head is configured to record the data in a second data track of the optical medium. The first head and the second head are configured to record concurrently. The optical reader system also includes encoding circuitry configured to encode source data to produce encoded data and distribute the encoded data to the first detector head and the second detector head. A first portion of the encoded data is transmitted to the first head and a second portion of the encoded data is transmitted to the second head.

Another embodiment provides a method of coding in an optical storage system having multiple heads. The method includes interleaving source data to produce an interleaved source data, encoding the interleaved source data to produce a first encoded data and a second encoded data, and distributing the first encoded data and the second encoded data to more than one of the multiple heads.

Another embodiment includes a method of decoding for a multiple-channel optical reader. The method includes reading multiple data blocks from multiple optical data channels. One of the multiple data blocks is read from a respective one of the multiple optical data channels. The method further includes generating multiple data streams based on the multiple data blocks, where one of the multiple data streams is generated from a respective one of the multiple data blocks. The method then includes performing a checksum test on each of the multiple data streams and utilizing a common decoder for each of the multiple data streams.

Yet another embodiment presents an optical reader system having a multi-head detector, an actuator, and encoding/decoding circuitry. The multi-head detector includes a first detector head and a second detector head. The first detector head is configured to record data in a first track of an optical disc of the optical reader system; and receive data from the first track. The second detector head is configured to concurrently record data in a second track of the optical disc when the first detector head records data in the first track, concurrently receive data from the first track when the first detector head records in the first track, and concurrently receive data from the second track when the first detector head receives from the first track. The optical reader system also includes an actuator configured to control the position of the multi-head detector with respect to the position of the optical disc. Furthermore, the optical reader system includes circuitry configured to distribute encoded data to the first detector head and the second detector head and decode received data from the first detector head and the second detector head.

DRAWINGS

These and other features, aspects, and advantages of the present invention will become better understood when the following detailed description is read with reference to the accompanying drawings in which like characters represent like parts throughout the drawings, wherein:

FIG. 2 is a schematic diagram depicting a conventional encoding technique, in accordance with an embodiment;

FIG. 4 is an illustration of an optical disc which may be read by a decoder with multiple heads, in accordance with an embodiment;

FIG. 5 is a schematic diagram depicting an encoding technique using a reader/writer having multiple heads (multi-head reader/writer), in accordance with an embodiment;

FIG. 8 is a schematic diagram depicting an encoding technique using detector head selection for a multi-head reader/writer, in accordance with an embodiment;

FIG. 9 is a schematic diagram depicting a decoding technique using a multi-head reader/writer, in accordance with an embodiment;

DETAILED DESCRIPTION

Figure 1:
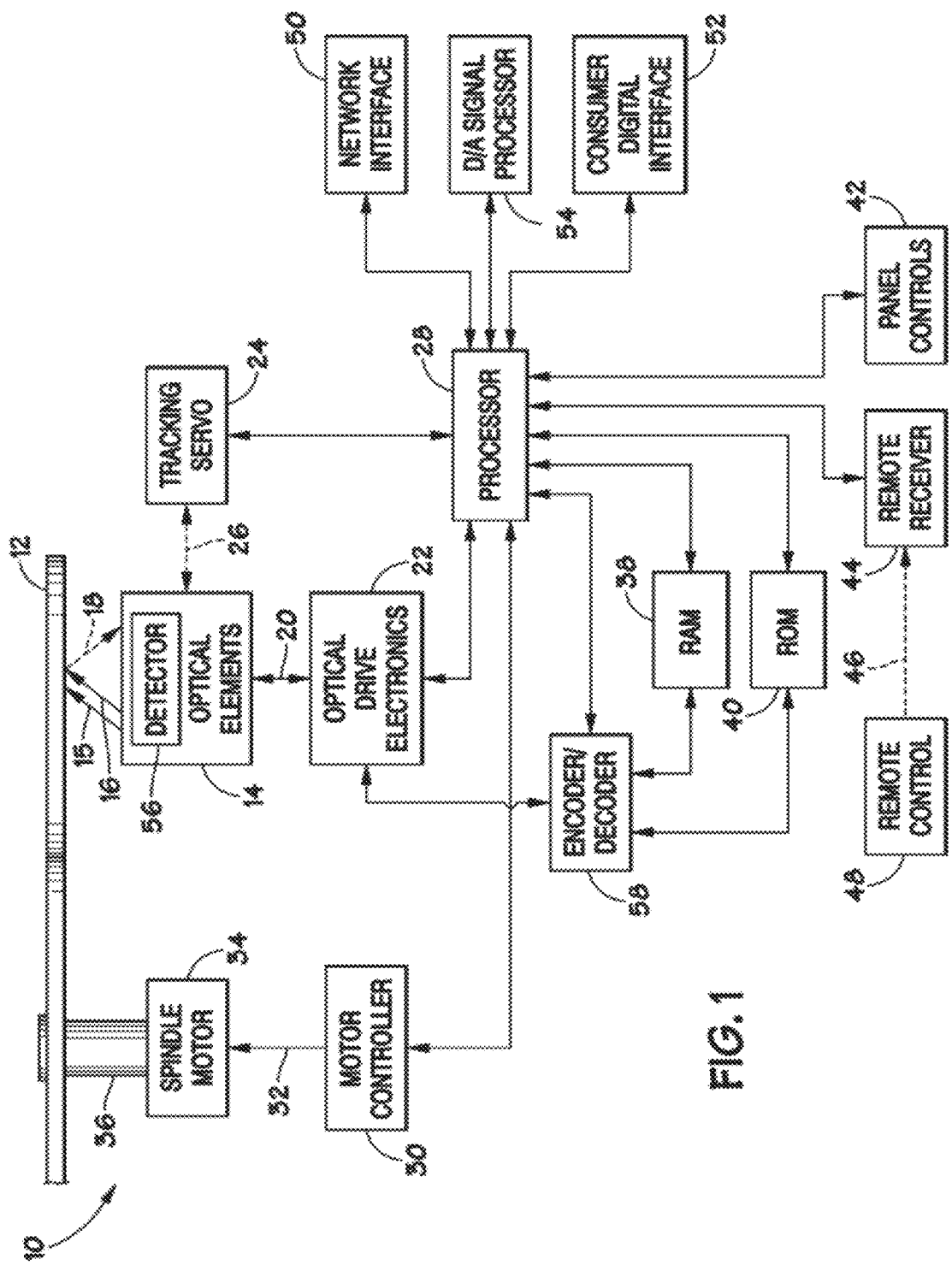
FIG. 1 is a block diagram depicting an optical reader system, in accordance with an embodiment.

Optical storage systems typically involve encoding a data source to be recorded in an optical medium, and then retrieving and decoding data from the optical medium to obtain information corresponding to the original data source. The recording process, also referred to as the writing process, may include transmitting a write beam and a reference beam from a read/write head to modulate the refractive index of the photosensitive material in the optical medium to write data in the form of optical data (e.g., holograms or micro-holograms). The data recorded in the medium may be encoded with forward error correction (FEC) encoding schemes, such as Reed-Solomon (RS) error correcting codes and/or turbo codes. Generally, FEC encoding may map a bit-stream (e.g., k bits long) to a code word (e.g., N bits long, where N is larger than k). The code word may include error correction bits which allow for the correction of errors occurring during the reading and/or writing of data onto the optical medium.

The retrieving process, also referred to as the reading process, may include transmitting a read beam (i.e., the reference beam) from the read/write head (also referred to as a read head or a detector head during a retrieving/reading process) to the optical medium and receiving a reflection beam including portions of the read beam reflected and/or scattered by optical data in the medium. The reflection beam may then be processed into a bit-stream which may undergo decoding to remove the error correction bits from the bit-stream.

Data rates for optical storage systems may be partially defined by the rate at which processes of recording and/or retrieving data are performed. For example, the read/write head may only transmit and receive beams at a certain rate to maintain accuracy in writing and reading, and encoding or decoding rates may be limited by the rates of the encoder/decoders. Further, while error correction coding may generally correct certain writing and/or reading errors, the typical error correction codes may be insufficient due to substantial imperfections of the optical medium, such as scratches or debris on a disk.

In one or more embodiments, optical storage systems including read/write components having multiple heads may increase data rates by enabling concurrent data writing and/or data reading over multiple channels (i.e., data tracks) of an optical medium. The multiple read/write heads may be referred to as a multi-head reader/writer, a multi-head writer or multi-head recorder during a write process, or a multi-head reader or multi-head decoder during a read process. Each read/write head may also be referred to as a head, which may have writing and/or reading capabilities in different embodiments.

Writing data over multiple channels may also increase accuracy, as the encoded bit-stream (i.e., the codeword) may be interleaved over multiple channels. For example, optical disc imperfections may often affect a single track, and data writing attempts limited to a single affected track may result in substantial write errors. Substantial write errors may result due to disc imperfections, and such substantial write errors may not always be correctable by typical error correction methods. However, if the codeword was interleaved and distributed over multiple channels (e.g., four channels of an optical disk), any error(s) resulting from recording a portion of the codeword in an affected track may be less significant. Further, typical error correcting codes may compensate for such less significant errors.

A storage system which may implement coding and decoding techniques using a multi-head reader/writer is provided in the block diagram of FIG. 1. While the particular storage system illustrated in FIG. 1 is an optical storage system 10, it should be noted that other types of storage systems may also implement the present techniques. The optical system 10 may be used to write and/or read data from storage medium such as optical storage discs 12. The data recorded on the optical data disc 12 may be in the form of holograms or micro-holograms, and may be generally referred to as optical data. Writing optical data to the optical data disc 12 may involve using a read/write head 56 (referred to also as a head 56) to transmit a write beam 15 and a reference beam (also referred to as the read beam 16) to the disc 12, such that the interference of the beams 15 and 16 may modulate the refractive index of the photosensitive material in the disc 12, thus forming the optical data. The head 56 may be generalized as optical elements 14, which may further include other different elements designed to generate excitation of beams, focus of beams, and detection of beams to and from the optical data disc 12. In some embodiments, the head 56 may be a multi-head reader/writer 56 and may transmit multiple sets of write beams 15 and reference beams 16 over different tracks of the disc 12.

Optical data may be read by projecting a read beam 16 from the head 56 onto the optical data disc 12. The read beam 16 may be reflected and/or scattered by the optical data in the disc 12, and the reflections and/or scatterings, referred to as a reflected beam 18, may be received at the head 56 and/or other optical elements 14. The reflected beam 18 may also include some combination of light reflected from optical data recorded in the optical storage disc 12, light reflected from a surface of the optical storage disc 12, and some interaction of the light reflected from the optical data and the light reflected from the surface. The optical elements 14 are controlled through a coupling 20 to an optical drive electronics package 22. The optical drive electronics package 22 may include such units as power supplies for one or more laser systems, detection electronics to detect an electronic signal from the head, analog-to-digital converters to convert the detected signal into a digital signal, and other units such as a bit predictor to predict when the detector signal is actually registering a bit value stored on the optical data disc 12.

The location of the optical elements 14 over the optical data disc 12 is controlled by a tracking servo 24 which has a mechanical actuator 26 configured to move the optical elements back and forth over the surface of the optical data disc 12. The optical drive electronics 22 and the tracking servo 24 are controlled by a processor 28. In some embodiments in accordance with the present techniques, the processor 28 may be capable of determining the position of the optical elements 14, based on sampling information which may be received by the optical elements 14 and fed back to the processor 28. The position of the optical elements 14 may be determined to enhance and/or amplify the reflection 18 or to reduce interferences of the reflection 18. In some embodiments, the tracking servo 24 or the optical drive electronics 22 may be capable of determining the position of the optical elements 14 based on sampling information received by the optical elements 14.

The processor 28 also controls a motor controller 30 which provides the power 32 to a spindle motor 34. The spindle motor 34 is coupled to a spindle 36 that controls the rotational speed of the optical data disc 12. As the optical elements 14 are moved from the outside edge of the optical data disc 12 closer to the spindle 36, the rotational speed of the optical data disc may be increased by the processor 28. This may be performed to keep the data rate of the data from the optical data disc 12 essentially the same when the optical elements 14 are at the outer edge as when the optical elements are at the inner edge. The maximum rotational speed of the disc may be about 500 revolutions per minute (rpm), 1000 rpm, 1500 rpm, 3000 rpm, 5000 rpm, 10,000 rpm, or higher.

In some embodiments, the optical storage system may include encoder/decoder circuitry 58, which may include circuitry for encoding a bit-stream with forward error correction (FEC) codes and for decoding an encoded bit-stream to remove error correction bits and/or correct errors which may have occurred during the reading and/or writing processes. The encoder/decoder circuitry 58 may be coupled to the optical drive electronics 22 for transmission of encoded data. The processor 28 may control certain encoding and/or decoding processes of the encoder/decoder circuitry 58. Further, various algorithms associated with the encoding and/or decoding processes may be stored in memory such as the RAM 38 or the ROM 40, and the encoder/decoder circuitry 58 may access the memory to perform encoding and/or decoding processes.

If the optical reader system 10 is a commercial unit, such as a consumer electronic device, it may have controls to allow the processor 28 to be accessed and controlled by a user. Such controls may take the form of panel controls 42, such as keyboards, program selection switches and the like. Further, control of the processor 28 may be performed by a remote receiver 44. The remote receiver 44 may be configured to receive a control signal 46 from a remote control 48. The control signal 46 may take the form of an infrared beam, an acoustic signal, or a radio signal, among others.

After the processor 28 has analyzed the data stored in the RAM 38 to generate a data stream, the data stream may be provided by the processor 28 to other units. For example, the data may be provided as a digital data stream through a network interface 50 to external digital units, such as computers or other devices located on an external network. Alternatively, the processor 28 may provide the digital data stream to a consumer electronics digital interface 52, such as a high-definition multi-media interface (HDMI), or other high-speed interfaces, such as a USB port, among others. The processor 28 may also have other connected interface units such as a digital-to-analog signal processor 54. The digital-to-analog signal processor 54 may allow the processor 28 to provide an analog signal for output to other types of devices, such as to an analog input signal on a television or to an audio signal input to an amplification system.

A schematic diagram depicting a conventional encoding technique is provided in FIG. 2. For example, a typical encoding process 60 may be that of a conventional turbo encoding process, which may implement parallel concatenation of convolutional codes. The process 60 may begin with an input of source data 62 to be recorded onto a storage media. For example, referring back to FIG. 1, the source data 62 may include information to be stored in the optical disc 12, and may be processed by the processor 28 into a form (e.g., a bit-stream) suitable for encoding in the encoding process 60. The source data 62 may be encoded at the encoder 66 and punctured at the puncturer 70. In some embodiments, the puncturer 70 may remove at least some of the error correction bits inserted by the encoder 66. The input data 62 may also be transmitted to the interleaver 64 which may rearrange or scramble the input data 62. The rearranged input data 62 may be encoded at the encoder 68 to produce an encoded input data which may be a permuted version of the data encoded by the encoder 66. The permuted encoded data may be punctured at the puncturer 72. The parallel concatenated data streams output from the puncturer 70 and the puncturer 72 may be multiplexed at the multiplexer 74, and the output 76 of the multiplexer 74 may be a composite interleaved encoded signal corresponding to the original input data 62.

Figure 3:
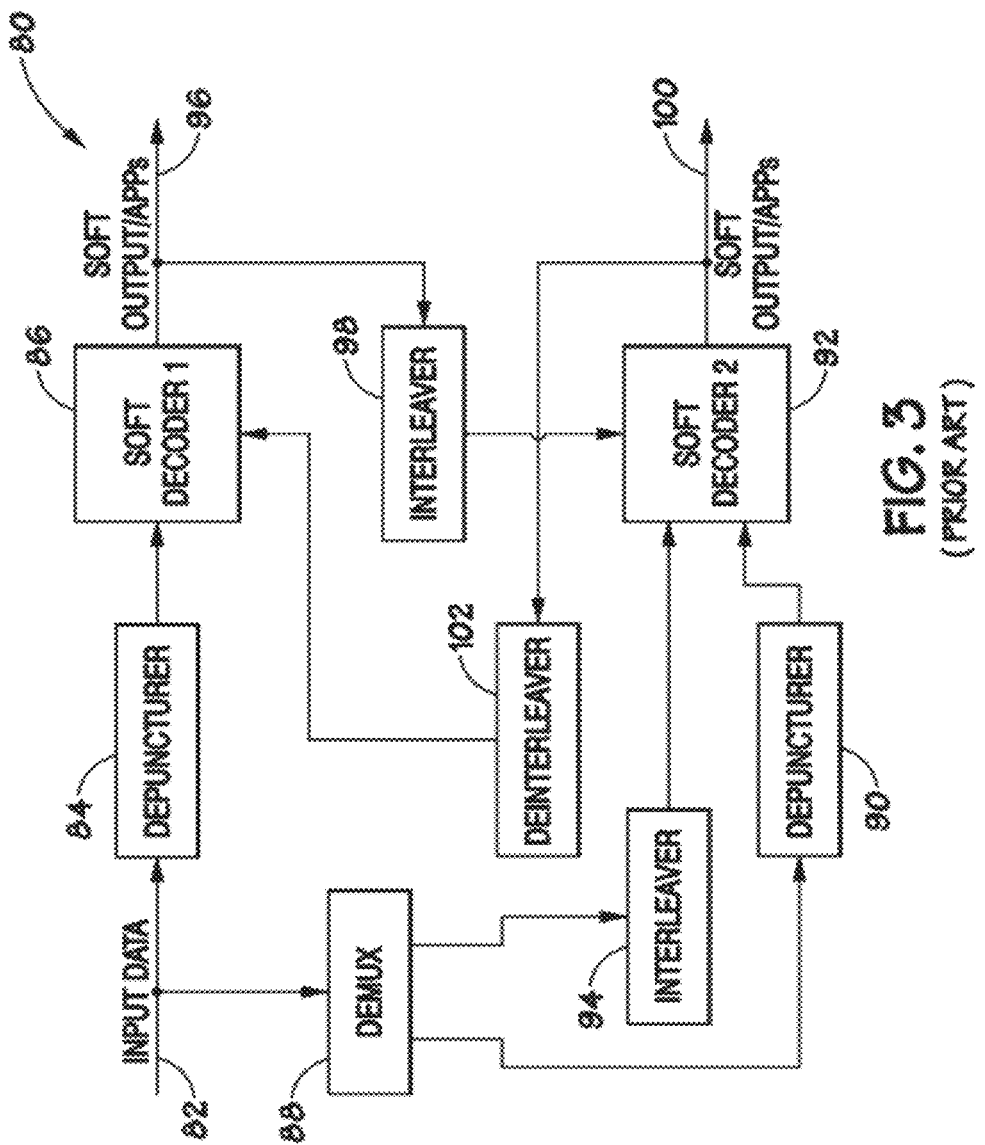
FIG. 3 is a schematic diagram depicting a conventional decoding technique, in accordance with an embodiment.

A schematic diagram depicting a conventional decoding technique is provided in FIG. 3. The decoding process 80 of FIG. 3 may be a conventional turbo decoding process suitable for decoding data encoded by the encoding process 60 of FIG. 2. The input data 82 of the decoding process 80 may be obtained from reading an optical disc 12, and may be similar to the output 76. However, the input data 82 is referenced differently to represent that the input data 82 may be different from the pre-recorded output 76 of FIG. 2 due to effects of reading and/or writing errors. The input data 82 may be depunctured at the depuncturer 84. The depuncturer 84 may replace at least some of the error correction pits removed by a puncturer. Further, the depunctured input data 82 may be decoded at the soft decoder 86 to produce soft outputs 96, which may be either an a priori probability or an a posteri probability of the originally pre-encoded information (e.g., data source or input data 62 in FIG. 2). Since the input signal 82 is a composite interleaved signal, the input signal 82 may be demultiplexed at the demultiplexer 88 to recover the two portions of the composite interleaved signal. The portion of the input signal 82 rearranged by the interleaver 64 during the encoding process 60 may be depunctured at the depuncturer 90 and decoded at the soft decoder 92. The soft outputs 100 of the soft decoder 92 may also be either an a priori probability or an a posteri probability of the originally pre-encoded information (e.g., data source or input data 62 in FIG. 2). Further, the turbo decoding process may involve retaining the soft outputs of the decoders 86 and 92 for iterative decoding. For iterative decoding, the soft output 100 may be deinterleaved at the deinterleaver 102 and input to the soft decoder 86 for decoding of the soft output 96, and the soft output 96 may be interleaved at the interleaver 98 and input to the soft decoder 92 for decoding of the soft output 100.

In typical encoding and decoding processes 60 and 80, one data input 62 may be encoded at a time, and one data input 82 may be decoded at a time. Further, in typical systems, data may be written to and read from one track in an optical disk. In one or more embodiments of the disclosed invention, the optical storage system 10 may implement a multi-head reader/writer, and the data written from each head may be written over multiple tracks of the disc 12, thus reducing write errors which may result from imperfections of the disc 12. Further, as data may be decoded and encoded over multiple tracks, data rates may be reduced. A top view of an optical disc 12 illustrating multiple data tracks 104 is provided in FIG. 4. The blocks 106 may represent the position of a head suitable for writing and reading data from the data tracks 104 of the disc 12. In some embodiments, a multi-head reader/writer 108 may be used to concurrently write and/or read data from multiple adjacent tracks 104 of the disc 12.

One embodiment of an encoding process suitable for encoding data to be written by a multi-head reader/writer over multiple tracks 102 of a disc 12 is provided in the block diagram of FIG. 5. Source data 112 is provided in the multi-head encoding process 110 in the form of a bit-stream. For example, referring back to FIG. 1, the source data 112 may include information to be written to an optical disc 12, and may be arranged and/or provided by the processor 28 which generally controls a data writing process in the storage system 10. The source data 112 may be encoded at an encoder 116 and punctured at a puncturer 118 to remove at least some of the error correcting bits inserted by the encoder 116. The encoder 116 may be a suitable turbo encoder, in some embodiments. The output data 120 may be the encoded, punctured data, and may be transmitted to a first head of a multi-head reader/writer. For example, the output data 120 may be first transmitted to optical drive electronics 22 for further processing (e.g., selection of optical symbols corresponding to the encoded bit-stream) before being transmitted to a head of the multi-head reader/writer 56.

The source data 112 may also be rearranged at an interleaver 114 before it is encoded at a second encoder 122 and punctured at a puncturer 124. By first rearranging (or scrambling) the source data 112, the rearranged data may have a length of N, which may be greater than a length of k of the original data source 112. In some embodiments, every stream of N information bits entering the second encoder 122 may be a permuted version of a stream of k information bits entering the first encoder 116. Therefore, the output 126 may be referred to as a permuted version of the encoded output 120. The output 126 may be transmitted through circuitry (e.g., optical drive electronics 22) and to a second head of the multi-head reader/writer 56.

Figure 6:
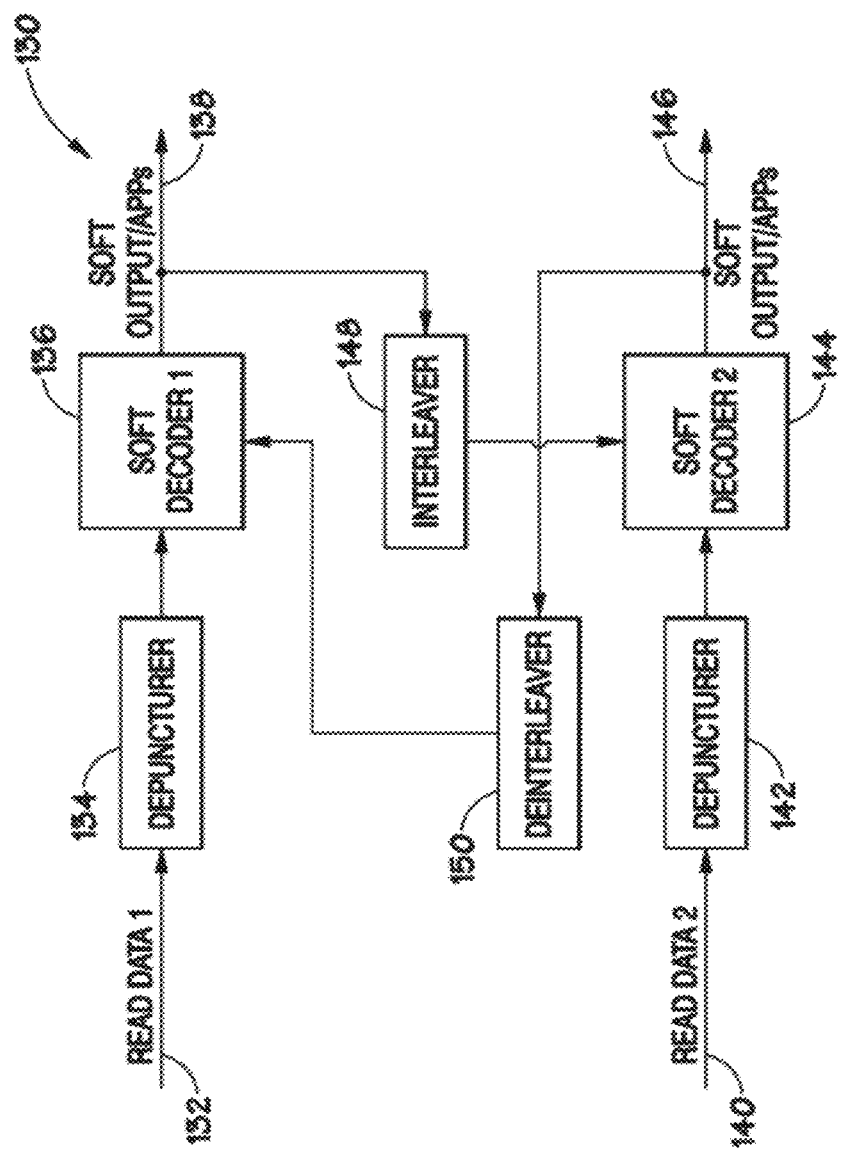
FIG. 6 is a schematic diagram depicting a decoding technique using a multi-head reader/writer, in accordance with an embodiment.

One embodiment of a decoding process suitable for decoding data read by a multi-head reader/writer 56 over multiple tracks 102 of a disc 12 is provided in the block diagram of FIG. 6. The read data 132 and 140 may represent data received at two heads of a multi-head reader/writer 56. Referring back to the encoding process 110 of FIG. 5, the read data 132 may correspond to encoded data not rearranged by the interleaver 114 during the encoding process 110. The read data 132 may be depunctured at the depuncturer 134 and decoded at the soft decoder 136. The soft output 138 of the soft decoder 136 may be either an a priori probability or an a posteri probability of the originally pre-encoded information (e.g., source data 112 in FIG. 5).

The read data 140 may correspond to encoded data rearranged by the interleaver 114 read by a detector head, and may be depunctured at the depuncturer 142 and decoded at the soft decoder 144. The soft output 138 of the soft decoder 136 may be either an a priori probability or an a posteri probability of the originally pre-encoded information. In some embodiments, the multi-head decoding process 130 may involve retaining the soft outputs of the decoders 136 and 144 for iterative decoding. For iterative decoding, the soft output 138 may be deinterleaved at the deinterleaver 148 and input to the soft decoder 144 for decoding of the soft output 146, and the soft output 146 may be interleaved at the interleaver 150 and input to the soft decoder 136 for decoding of the soft output 138. The interleaving and deinterleaving of the soft outputs 138 and 146 may provide the soft-decoded data in a suitable arrangement for the decoders 144 and 136.

Figure 7:
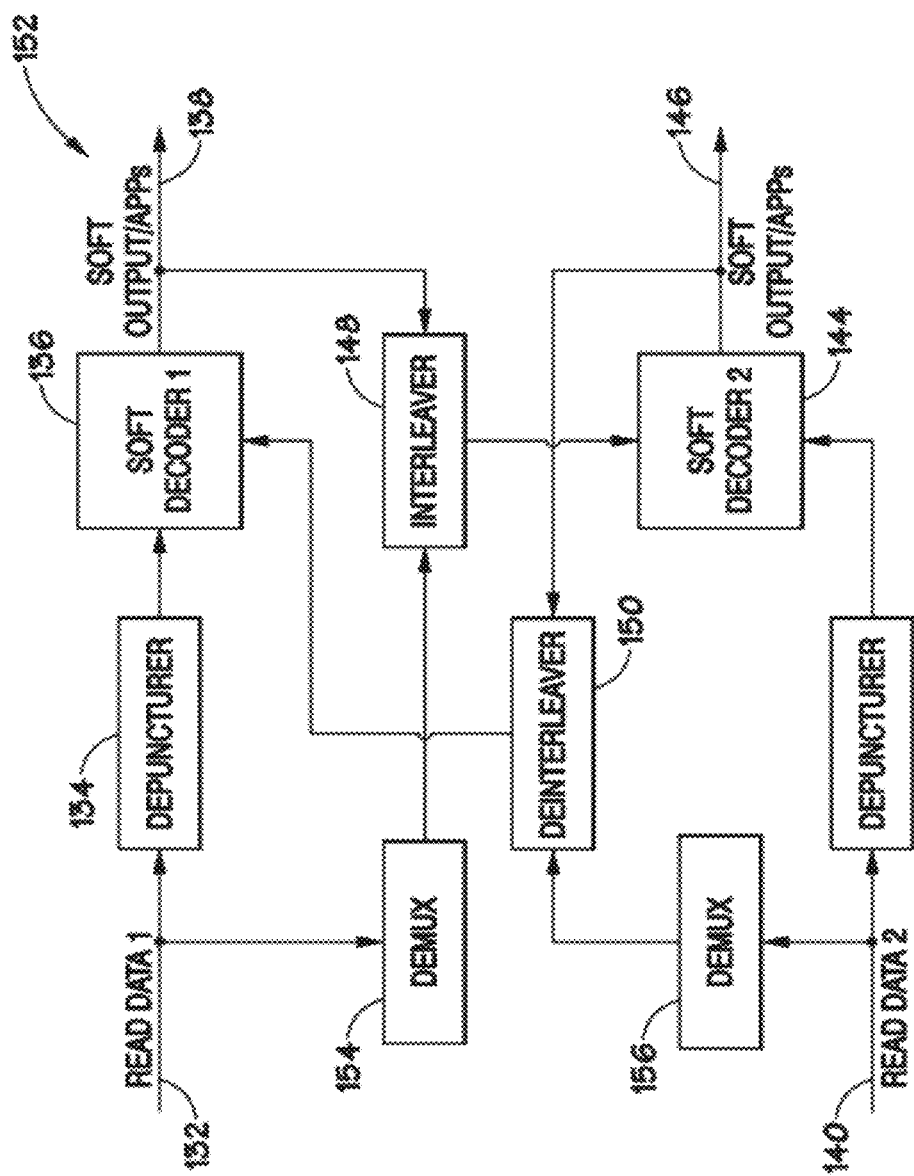
FIG. 7 is a schematic diagram depicting another decoding technique using a multi-head reader/writer, in accordance with an embodiment.

Another embodiment of a decoding process suitable for decoding data read by a multi-head detector is provided in the block diagram of FIG. 7. The process 152 of FIG. 7 may be similar to the process 130 of FIG. 6, and the process 152 may include the read data 132 to be directly transmitted via a demultiplexer 154 to the interleaver 148 to interleave the data to have a suitable arrangement for the decoder 144. Similarly, the read data 140 may be directly transferred via a demultiplexer 156 to the deinterleaver 150 to deinterleave the interleaved read data 140 so that the data may be in a suitable arrangement for the soft decoder 136. The direct transmission of the read data 132 and 140 read from the detector heads may be used by the decoders 136 and 144 for iterative decoding.

The schematic diagram of FIG. 8 provides another embodiment of an encoding process using a head selection method for a multi-head reader/writer. The encoding process 160 may be similar to the encoding process 110 described in FIG. 5, and may additionally include a selector 162 to select the data which is transmitted to be written by either a first head or a second head of a multi-head reader/writer. For example, the interleaved, encoded, and punctured data transmitted out of the puncturer 124 may be transmitted to either the first head or the second head depending on the selection of the selector 162, and the selection of either head may change over time. Similarly, the encoded and punctured data transmitted out of the puncture 118 may be transmitted to either the first head or the second head based on the selection of the selector 162. Selecting different heads to record the encoded bit-stream and the permuted version (interleaved) version of the encoded bit-stream may increase the diversity of the recorded data 120 and 126 on a disc 12, potentially resulting in reduced error rates when the data is retrieved and decoded.

A corresponding decoding process for the encoding process of FIG. 8 is provided in the schematic diagram of FIG. 9. The decoding process 170 may be similar to the decoding process 130 described in FIG. 6. In the decoding process 170 of FIG. 9, the read data 132 and 140 may be read from a disc 12, and may correspond to the output data 120 and 126, for example. The read data 132 and 140 may be different from the output data 120 and 126 due to writing and/or reading errors. The read data 132 may be transmitted through a selector 174, and the read data 140 may be transmitted through a selector 178. The selectors 174 and 178 may select whether to send the read data 132 and 140 to a multiplexer 176 and a multiplexer 179, respectively, which may multiplex the two read data signals 132 and 140 and transmit each of the multiplexed signals to the depuncturer 134 or depuncturer 142. The depunctured multiplexed signal may be decoded at the soft decoder 136 and output as a soft output 138.

As discussed, if data is encoded using the encoding process 160 of FIG. 8, the data read from a track may have include data encoded by the encoder 116, as well as the permuted version of the data which has been rearranged by the interleaver 114 and encoded by the encoder 122. Based on the encoding of the read data 132, the selector 174 may transmit the read data 132 to the interleaver 156 to be rearranged for the soft decoder 144 or to the selector 178. The selector 178 may select between transmitting the read data 132 or the read data 140 to the deinterleaver 150 or to the depuncturer 142. The selection of the selectors 174 and 178 may be based on the encoding of the read data 132 and 140.

Figure 10:
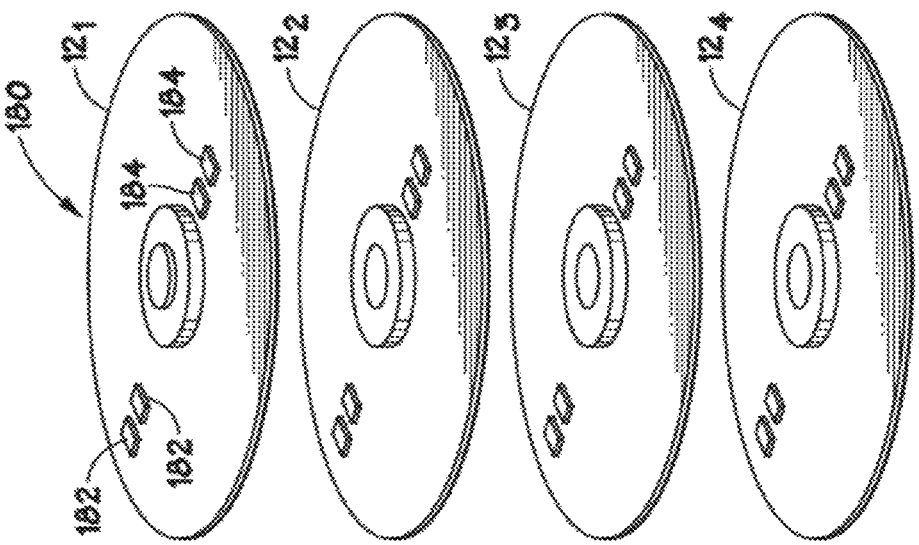
FIG. 10 is a schematic diagram depicting multiple encoders to each record with multiple heads, in accordance with an embodiment.

The encoding and decoding processes implementing multiple heads may also involve multi-head encoding and decoding over multiple discs 12 in some embodiments. As illustrated in FIG. 10, the blocks 182 and 184 may each represent reader/writer head positions over multiple tracks of the multiple discs $12_1$-$12_4$. In some embodiments, the encoding and recording of data over multiple tracks 182 and/or 184 and multiple discs $12_1$-$12_4$ may occur substantially simultaneously. For example, in some embodiments, the data may be recorded to a first disc $12_1$ using an encoded bit-stream distributed to multiple heads. The multiple heads may record the encoded bit-stream to the first disc $12_1$. Similarly, the same encoded bit-stream recorded on $12_1$ may be used to create replication discs $12_2$-$12_4$ by distributing the same encoded bit-stream over multiple heads.

Figure 11:
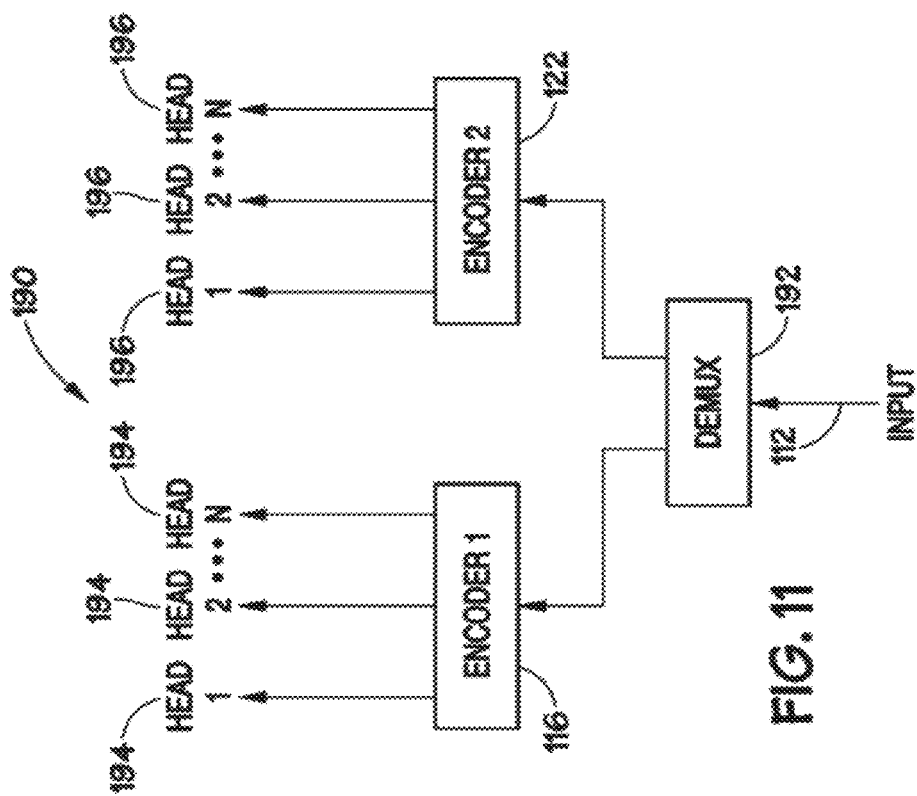
FIG. 11 is an illustration depicting multiple discs which may be encoded or decoded using a multi-head reader/writer, in accordance with an embodiment.

Furthermore, in some embodiments, the system 10 (as in FIG. 1) may include multiple encoders 194 and 196, each suitable for encoding data for a multi-head reader/writer (having N heads, as illustrated). Such a multi-encoder system 190 as illustrated in FIG. 11 may be suitable when relatively high data rates are desirable, and the desired data rate may be faster than a real-time encoding or decoding rate of a single code. By demultiplexing the input signal 112 at the demultiplexer 192 for distribution to the encoders 194 and 196, multiple encoders 194 and 196 may concurrently encode data to reach a desirable data rate.

Figure 12:
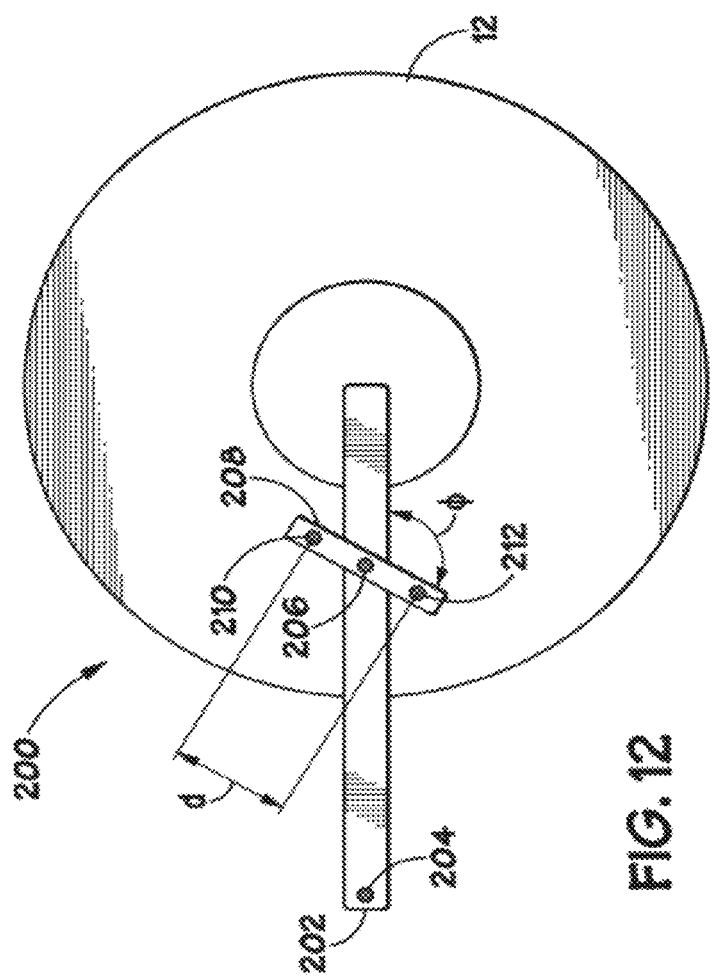
FIG. 12 is an illustration depicting a reading arm having a multi-head reader/writer configured to read an optical disc, in accordance with an embodiment.

FIG. 12 provides an illustration depicting one embodiment of a read/write arm in an optical storage system 10 having a multi-head reader/writer configured to read from and/or write on an optical disc. The multi-head read/write arm system 200 may include a first arm 202 which may extend over a surface of an optical disc 12. The first arm 202 may be secured to the optical storage system 10 by a fastening mechanism 204. Heads 210 and 212 may be connected to a second arm 208, attached to the first arm 202 by a connecting mechanism 206. The heads 210 may be rotatable around the connecting mechanism 206, and further, the distance d between the heads 210 and 212 may be variable. For example, the heads 210 and 212 may be movable closer to or farther from the connecting mechanism 206. In some embodiments, a multi-head read/write arm system 200 may include multiple first arms 202, and a first arm may be used for more than two heads 210 and 212.

In some embodiments, the heads 210 and 212 may be positioned over the surface of the disc 12 to aid in focusing while decreasing movement of the disc 12. For example, one or more of spatially orthogonal displacement actuators operating in the plane of the disc 12 or vertical displacement actuators operating in a normal plane to the disc 12 may be used (e.g., mechanical actuator 26 in FIG. 1). Further, tilt actuators may also be used to aid in tracking of the heads 210 and 212 over data tracks of the disc 12. Movement of the actuators and rotational and/or linear movements of the first arm 202 or the secondary arm 208 may involve utilizing one or more of voice coil technology, piezoelectric technology, and electrostatic technology.

Data rates may also be adjustable for each head 210 or 212 based on the position of the head 210 or 212 on the arm 202 with respect to the disc 12. If the two heads 210 and 212 are located at the same distance from the connecting mechanism 206, the data rate of the head 210 plus the data rate of the head 212 may be twice the data rate of a hypothetical read/write head located at the position of the connecting mechanism 206. In some embodiments, to concurrently read different data tracks having different circumferences, the data rate of one head 212 may be adjustable to be faster than the data rate of a head 210 closer to the center of the disc 12 and having a smaller circumference than a data track read by the head 212. Further, in some embodiments, the positions of the heads 210 and 212 may be used to perform read after write (RAW) verification. For example, by positioning the head 212 to read over the same data track on the disc 12 as the head 210, the head 210 may write data to the track while the head 212 immediately reads and verifies the data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical storage system, comprising:
   multiple heads comprising a first head and a second head, wherein the first head is configured to record data in a first data track of an optical medium of the optical reader system and the second head is configured to record the data in a second data track of the optical medium, wherein the first head and the second head are configured to record concurrently, and wherein the first data track and the second data track are on a common data layer; and
   encoding circuitry configured to:
      encode source data to produce encoded data; and
      distribute the encoded data to the first head and the second head, wherein a first portion of the encoded data is transmitted to the first head and a second portion of the encoded data is transmitted to the second head.

2. The system of claim 1, wherein the encoding circuitry comprises two or more encoders configured to perform forward error correction coding on the source data.

3. The system of claim 2, wherein the forward error correction coding is turbo coding.

4. The system of claim 2, wherein the encoding circuitry comprises a puncturer configured to remove bits inserted by the two or more encoders to produce the encoded data.

5. The system of claim 2, wherein the encoding circuitry comprises an interleaver configured to rearrange the source data, wherein the source data is encoded at a first encoder of the two or more encoders to generate a first encoded data segment of the encoded data, and rearranged source data is encoded at a second encoder of the two or more encoders to generate a second encoded data segment of the encoded data.

6. The system of claim 5, wherein the first encoded data segment is transmitted to the first head and the second encoded data segment is transmitted to the second head.

7. The system of claim 5, comprising selecting circuitry configured to selectively transmit the first encoded data segment or the second encoded data segment to the first head and to selectively transmit the first encoded data segment or the second encoded data segment to the second head.

8. The system of claim 1, wherein the first head and the second head are configured to concurrently receive data from the optical medium, wherein the first head receives a first received data and the second head receives a second received data.

9. The system of claim 8, comprising decoding circuitry configured to decode the first received data and the second received data substantially concurrently and output a decoded data comprising an estimate of the source data.

10. The system of claim 8, comprising decoding circuitry comprising a first decoder configured to decode the first received data to generate a first estimate and a second decoder configured to decode the second received data to generate a second estimate, wherein the first estimate and the second estimate are estimates of the source data.

11. The system of claim 10, wherein the encoding circuitry comprises a puncturer configured to remove bits from the encoded data, and wherein the decoding circuitry comprises a depuncturer configured to replace the removed bits.

12. The system of claim 10, wherein the decoding circuitry comprises an interleaver and a deinterleaver, wherein the interleaver is configured to rearrange the first estimate and transmit a rearranged first estimate to the second decoder and the deinterleaver is configured to rearrange the second estimate and transmit a rearranged second estimate to the first decoder.

13. The system of claim 1, wherein the optical reader system is configured to encode and record data to multiple optical media concurrently.

14. The method of claim 1, comprising verification circuitry configured to perform read after write (RAW) verification on the recorded data, wherein the second head is capable of reading the data recorded by the first head immediately after the first head records the data in the optical medium.

15. A method of coding in an optical storage system having multiple heads, the method comprising:
   interleaving source data to produce an interleaved source data;
   encoding the interleaved source data to produce a first encoded data and a second encoded data;
   distributing the first encoded data and the second encoded data to more than one of the multiple heads;
   selecting to distribute the first encoded data or the second encoded data to a first head; and
   selecting to distribute the first encoded data or the second encoded data to a second head in a complementary manner to the first encoded data or the second encoded data distributed to the first head.

16. The method of claim 15, comprising:
   retrieving a first read data using a first head of the multiple heads from an optical disc of the optical storage system;
   retrieving a second read data using a second head of the multiple heads from the optical disc; and
   decoding the first and second read data to produce a first decoded data and a second decoded data, wherein the first and second decoded data is an estimate of information in the source data.

17. The method of claim 16, comprising:
   interleaving the first decoded data to produce interleaved first estimates;
   decoding the interleaved first estimates at a second decoder;
   deinterleaving the second decoded data to produce deinterleaved second estimates; and
   decoding the deinterleaved second estimates at a first decoder.

18. A method of decoding for a multiple-channel optical reader, the method comprising:
   reading multiple data blocks from multiple optical data channels, wherein one of the multiple data blocks is read from a respective one of the multiple optical data channels;
   generating multiple data streams based on the multiple data blocks, wherein one of the multiple data streams is generated from a respective one of the multiple data blocks;
   performing a checksum test on each of the multiple data streams; and
   utilizing a common decoder for each of the multiple data streams.

19. An optical storage system, comprising:
   a multi-head detector comprising a first detector head and a second detector head, wherein the first detector head is configured to:
      record data in a first track of an optical disc of the optical reader system; and
      receive data from the first track;
   and the second detector head is configured to:
      concurrently record data in a second track of the optical disc when the first detector head records data in the first track;
      concurrently receive data from the first track when the first detector head records in the first track; and
      concurrently receive data from the second track when the first detector head receives from the first track; and
   an actuator configured to control a position of the multi-head detector with respect to a position of the optical disc; and
   circuitry configured to:
      distribute encoded data to the first detector head and the second detector head; and
      decode received data from the first detector head and the second detector head.

20. The system of claim 19, wherein the actuator comprises one or more of orthogonal displacement actuators, vertical displacement actuators, and tilt actuators.

21. The system of claim 19, wherein the actuator is controlled using one or more of voice coil techniques, piezoelectric techniques, and electrostatic techniques.

22. The system of claim 19, comprising one or more detector arms configured to couple the first detector head and the second detector head to the optical disc.

23. The system of claim 19, wherein the first detector head is configured to record data on the first track and the second detector head is configured to receive the recorded data from the first track immediately after the first detector head records the data, and wherein the circuitry is configured to perform read after write (RAW) verification on the data recorded by the first detector head on the first track.

* * * * *